(12) United States Patent
Weber (10) Patent No.: US 11,884,231 B2
(45) Date of Patent: Jan. 30, 2024

(54) DEFLECTOR FOR A DIFFUSOR OF A GAS GENERATOR

(71) Applicant: ZF Airbag Germany GmbH, Aschau a. Inn (DE)

(72) Inventor: Bernd Weber, Erharting (DE)

(73) Assignee: ZF Airbag Germany GmbH, Aschau a. Inn (DE)

( * ) Notice: Subject to any disclaimer, the term of this patent is extended or adjusted under 35 U.S.C. 154(b) by 0 days.

(21) Appl. No.: 17/639,001

(22) PCT Filed: Jul. 29, 2020

(86) PCT No.: PCT/EP2020/071411
§ 371 (c)(1),
(2) Date: Feb. 28, 2022

(87) PCT Pub. No.: WO2021/037470
PCT Pub. Date: Mar. 4, 2021

(65) Prior Publication Data
US 2022/0266788 A1    Aug. 25, 2022

(30) Foreign Application Priority Data

Aug. 27, 2019   (DE) .......................... 102019122989.8

(51) Int. Cl.
*B60R 21/262*     (2011.01)
*B60R 21/264*     (2006.01)
(52) U.S. Cl.
CPC .......... *B60R 21/262* (2013.01); *B60R 21/264* (2013.01)

(58) Field of Classification Search
CPC ................................................ B60R 21/262
See application file for complete search history.

(56) References Cited

U.S. PATENT DOCUMENTS

| | | | |
|---|---|---|---|
| 2003/0094798 A1* | 5/2003 | Ogata | B60R 21/26 |
| | | | 280/730.2 |
| 2022/0274557 A1* | 9/2022 | Disam | B60R 21/261 |

FOREIGN PATENT DOCUMENTS

| | | | | |
|---|---|---|---|---|
| CN | 112805189 A | * | 5/2021 | ......... B60R 21/2171 |
| CN | 114269610 A | * | 4/2022 | ......... B60R 21/2171 |
| DE | 19626463 A1 | | 1/1998 | |
| DE | 19850448 A1 | * | 5/2000 | ............ B60R 21/26 |
| DE | 20300500 U1 | * | 6/2003 | ............ B60R 21/26 |
| DE | 10318133 A1 | | 10/2003 | |
| DE | 20310575 U1 | | 11/2003 | |
| DE | 102004040235 A1 | | 3/2006 | |

(Continued)

OTHER PUBLICATIONS

International Search Report and Written Opinion for PCT/EP2020/071411 dated Sep. 14, 2020 (11 pages; with English translation).

*Primary Examiner* — Nicole T Verley
(74) *Attorney, Agent, or Firm* — Kristin L. Murphy (57) ABSTRACT

A deflector for a diffusor of a gas generator of an airbag module is disclosed. The deflector comprises a substantially tubular deflector base body and a gas discharge device connected thereto, wherein the gas discharge device has a substantially rectangular base and two outflow regions on opposite sidewalls so that gas can flow substantially in opposite directions along the longitudinal axes of the tubular deflector base body out of the interior of the gas discharge device to the outside.

15 Claims, 7 Drawing Sheets

(56) References Cited

FOREIGN PATENT DOCUMENTS

| | | | | |
|---|---|---|---|---|
| DE | 60214420 T2 | 3/2007 | | |
| DE | 102006041611 A1 | 3/2008 | | |
| DE | 102007046822 A1 | 4/2009 | | |
| DE | 102008063789 A1 | 7/2010 | | |
| DE | 102019100262 A1 * | 4/2020 | ......... | B60R 21/2171 |
| DE | 102019122990 A1 * | 3/2021 | ........... | B60R 21/261 |
| GB | 2406312 A * | 3/2005 | ............. | B60R 21/26 |
| JP | H10138854 A | 5/1998 | | |
| JP | 2003127821 A | 5/2003 | | |
| JP | 2003160017 A | 6/2003 | | |
| JP | 2003291766 A * | 10/2003 | | |
| WO | WO-2005110820 A1 * | 11/2005 | ........... | B60R 21/232 |
| WO | WO-2021037602 A1 * | 3/2021 | ........... | B60R 21/261 |

* cited by examiner

DEFLECTOR FOR A DIFFUSOR OF A GAS GENERATOR

CROSS-REFERENCE TO RELATED APPLICATIONS

This application is a national stage of International Application No. PCT/EP2020/071411, filed Jul. 29, 2020, the disclosure of which is incorporated herein by reference in its entirety, and which claimed priority to German Patent Application No. 102019122989.8, filed Aug. 27, 2019, the disclosure of which is incorporated herein by reference in its entirety.

TECHNICAL FIELD

The disclosure relates to a deflector for a diffusor of a gas generator. The disclosure also relates to a diffusor-deflector assembly group of a gas generator comprising such deflector. Further, the disclosure relates to a gas generator comprising such diffusor-deflector assembly group. Moreover, the disclosure deals with an airbag module including such a gas generator. Also, the disclosure shows a method for manufacturing such deflector and a mounting method of such deflector on a diffusor of a gas generator.

BACKGROUND

From DE 103 18 133 A1, a housing for attaching to a gas generator, in particular to an end-side diffusor of the gas generator, is known which is configured to have two gas discharge channels. Said housing constitutes a deflector comprising a substantially tubular deflector base body and a gas discharge device connected thereto.

The known deflector can be directly attached, as a cap, to a gas generator. There is a need for a deflector which can be manufactured in a simple and low-cost manner and is compatible with existing diffusors.

SUMMARY

Against this backdrop, a deflector for a diffusor of a gas generator is disclosed which is easy to manufacture and allows for an improved gas guidance when gas flows out of the gas generator so that a mechanical and/or thermal load of an inflatable airbag which is connected to the gas generator or diffusor and/or deflector can be reduced. A diffusor-deflector assembly group and a gas generator comprising such diffusor-deflector assembly group is also disclosed. Moreover, an airbag module and a vehicle safety system comprising a gas generator as well as a method for manufacturing a deflector for a diffusor of a gas generator and a mounting method for a deflector on a diffusor for a gas generator is also disclosed.

In accordance with disclosure, a gas discharge device has a substantially rectangular base and two outflow regions on opposite sidewalls so that gas can flow out of the interior of the gas discharge device to the outside substantially in opposite directions along the longitudinal axis of the tubular deflector base body. In particular, the gas discharge device shows, when viewed from its top view, a substantially rectangular shape along its longitudinal extension. In particular, an outer contour or an outer envelope of the gas discharge device can further be regarded as being box-shaped or cuboid-shaped. A deflector according to the disclosure can be manufactured simply and at low cost by forming out of a tube length. The deflector offers the further advantage that it can be attached to known diffusors of gas generators. The deflector allows for filling one airbag with gas in a manner gentle on the material and advantageous in terms of gas flow as well as for filling two airbags at the same time. By using a deflector according to the disclosure, thus in particular the use of complex and cost-intensive airbags which include a so-called additional calzone, for example, i.e., a shield of heat-resistant and particle-resistant fabric disposed either at the gas outflow opening of the gas generator or as an inner bag inside the airbag, can be dispensed with. In addition, the substantially rectangular base of the gas discharge device of the diffusor according to the disclosure, on the one hand, can help provide an extremely space-saving diffusor and, on the other hand, this shaping can help connect another adjacent component part, such as an airbag module or a holder for further component groups, in a geometrically simple and extremely precise and geometrically accurate manner.

In one exemplary arrangement, a deflector base body is integrally connected to the gas discharge device, which means easy handling during mounting and/or manufacture, and outflow regions are disposed in two deflector tabs of the gas discharge device which can be positioned relative to an axis perpendicular to a longitudinal axis of the tubular deflector base body in such a way that a respective discharge angle can be set between 0° and 35°. The diffusor tabs may be configured especially in the form of a tongue tiltable about the afore-mentioned axis. When a discharge angle is set to be 0°, the diffusor tab is perpendicular to the longitudinal axis of the tubular deflector base body. The discharge angle may be set differently for a first diffusor tab and an opposite second diffusor tab. In this way, fine adjustments concerning an inflation behavior of an inflatable airbag can be made.

In another exemplary arrangement, a guide tab is arranged perpendicularly to each of the deflector tabs on both sides. The guide tabs are appropriately formed by opposite sidewalls of the gas discharge device. In this way, gas flowing out of the interior of the deflector to the outside through the outflow regions can be controlled even better and, resp., can be influenced or guided concerning its further flow path, wherein the outflowing gas can be advantageously forwarded by the guide tabs over a certain distance in channel shape and virtually according to the principle of "blinders".

In another exemplary arrangement, the deflector tab includes on each side facing the tubular deflector base body a curved cutout having a radius that corresponds in particular to a radius of the tubular deflector base body. In a mounted state of the deflector to a gas generator, in particular the diffusor of a gas generator, an extremely tight connection can thus be ensured so that outflowing gas is guided substantially only through the outflow regions of the gas discharge device and an undesired other gas bypass can be avoided.

One independent aspect of the disclosure relates to a diffusor-deflector assembly group for a gas generator, in particular for a tubular gas generator of an airbag module, comprising a diffusor having a substantially tubular base body with a longitudinal axis, a baffle cap connected to the base body at a first end of the base body and a connecting device formed at a second end opposite to the first end of the base body. In one exemplary arrangement, the connecting device is in the form of a taper. At least one opening is formed in a wall of the tubular base body.

The diffusor-deflector assembly group further comprises a deflector according to the disclosure, an outer diameter of the base body of the diffusor being slightly smaller than an inner diameter of the deflector, wherein preferably the outer diameter of the base body of the diffusor and the inner diameter of the deflector are positively adapted to each other.

In one exemplary arrangement, the at least one opening is a substantially rectangular opening. By substantially rectangular it is to be understood that the lateral edges extend in parallel or almost in parallel. The corners of the rectangular opening may be rounded.

In one exemplary arrangement, the substantially rectangular opening in the wall of the base body of the diffusor has a length corresponding to a distance between deflector tab axes and a width corresponding to a deflector tab width. Thus, the geometry of the discharge or outflow area of the rectangular opening can be precisely adapted to the deflector connected thereto and, resp., to the corresponding effective area of flow of the deflector.

In one exemplary arrangement, the at least one opening is formed by a plurality of through-holes in an outflow region of the base body of the diffusor which particularly has a length corresponding to the distance between the deflector tab axes and a width corresponding to the deflector tab width. The plurality of through-holes may be arranged in rows.

Another independent aspect of the disclosure relates to a gas generator, and in one exemplary arrangement, a tubular gas generator, for an airbag module comprising a tubular housing and comprising a diffusor-deflector assembly group according to the disclosure that is arranged at a first end of the gas generator, the gas generator being a pyrotechnic gas generator or a hybrid gas generator.

In one exemplary arrangement, a diameter of the gas generator and a diameter of the diffusor are substantially equal.

In one exemplary arrangement, housing of the gas generator at the first end has a taper in which a taper of the diffusor engages. The diffusor is fixed to the housing of the gas generator by a corresponding crimping or roller-burnishing.

Another independent aspect of the disclosure relates to an airbag module comprising a gas generator, an airbag inflatable by the gas generator and a fastening device for attaching the airbag module to a vehicle, the gas generator as above-described being configured as the gas generator according to the disclosure.

Further, within the scope of the present application, a vehicle safety system, in particular for protecting a person such as a vehicle occupant or a pedestrian, comprising a gas generator, an airbag inflatable by the latter as part of an airbag module, and an electronic control unit by means of which the gas generator can be activated when a release situation is given, is suggested, the gas generator as above-described being configured as the gas generator according to the disclosure.

Another independent aspect of the disclosure relates to a method for manufacturing a deflector for a diffusor of a gas generator, for example, for a tubular gas generator of an airbag module, comprising the following steps of:
 a) providing a tubular deflector base body having a predetermined inner diameter and a first end and a second end,
 b) forming a profile in a circumferential tube section of the deflector base body by a profile tool by pressing or pulling the profile tool from an inner face of the deflector base body against the wall of the deflector base body in the radial direction,
 c) producing through-holes in a region of the profile and producing a curved cutout at each of opposite ends of the profile,
 d) cutting the profile in the axial direction from a first end and a second end of the profile up to a predetermined length by two respective cuts spaced apart from each other so that a deflector tab is produced at each of the two ends of the profile, and
 e) bending the two deflector tabs radially inwards.

The method according to the disclosure is simple and inexpensive. In step c), producing through-holes and producing the curved cutouts can be carried out in particular by punching, drilling or cutting, and in one exemplary arrangement, by laser-cutting. In step d), by the term "cutting" it is also to be understood that this can be performed by a purely mechanical cutting tool, but also by laser-cutting or else by punching, for example.

In one exemplary configuration, the profile tool is a square profile tool.

In another exemplary configuration, the cuts are arranged at the edges of the profile.

The deflector tabs are expediently adjusted to an angle of from 0° to 35° relative to a radial direction. This means that the deflector tabs can be bent inwards corresponding to the angle.

Another independent aspect of the disclosure relates to a mounting method for a deflector on a diffusor for a gas generator, comprising the following steps of:
 a) providing a deflector according to any one of the claims 1 to 6,
 b) providing a diffusor comprising a substantially tubular base body with a longitudinal axis, a baffle cap connected to the base body at a first end of the base body and a connecting device formed at a second end opposite to the first end of the base body, preferably in the form of a taper, at least one opening being formed in the wall of the tubular base body,
 c) sliding the deflector onto the diffusor, and
 e) aligning the deflector with the diffusor so that the gas discharge device of the deflector is aligned above the at least one opening of the diffusor.

The mounting method according to the disclosure allows a deflector to be mounted on a diffusor in a simple and low-cost manner.

BRIEF DESCRIPTION OF DRAWINGS

In the following, exemplary arrangements of the disclosure shall be illustrated in detail with reference to the attached Figures, wherein.

DETAILED DESCRIPTION

Figure 1:
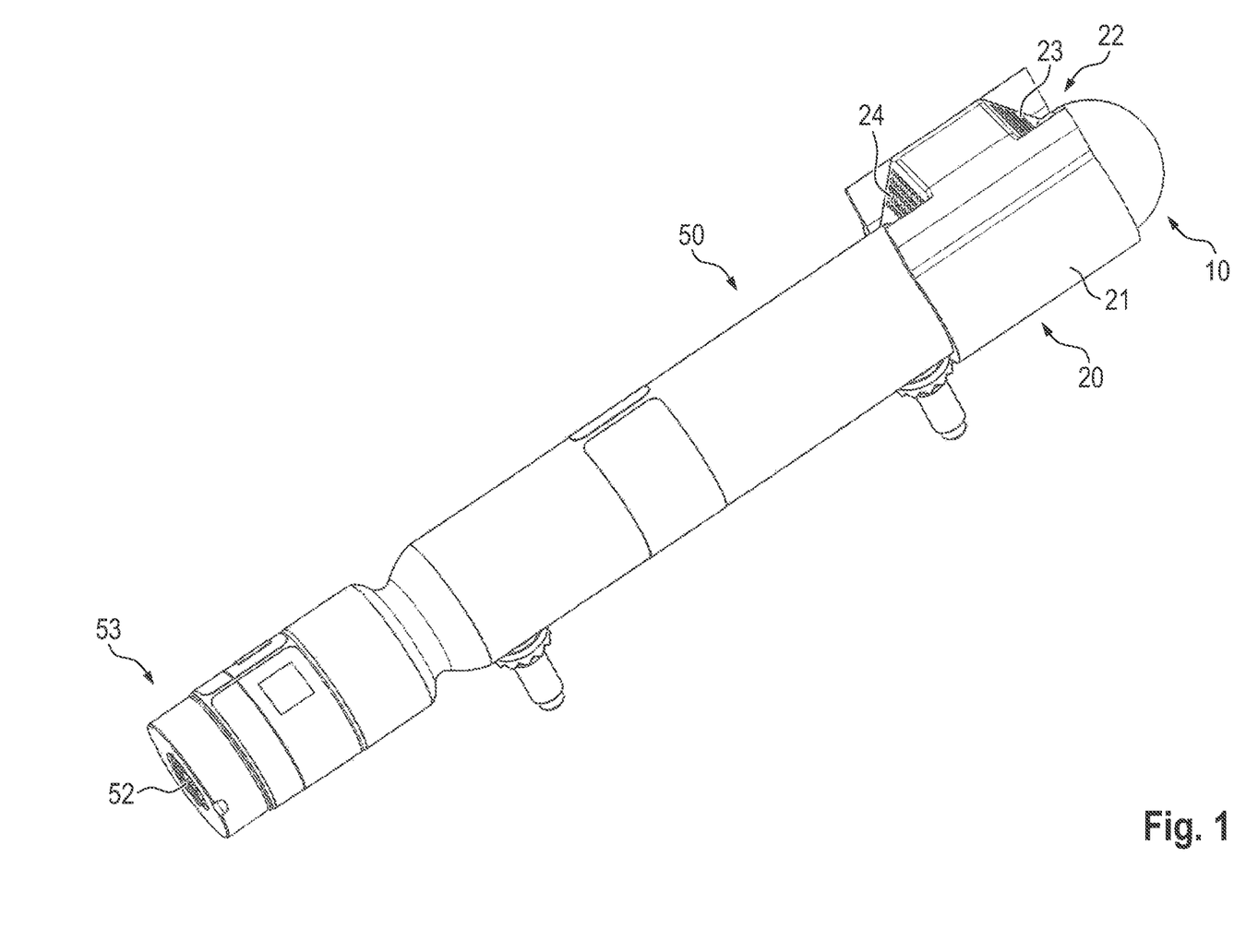
FIG. 1 shows a gas generator comprising a diffusor and a deflector according to the disclosure.

FIG. 1 illustrates a gas generator 50, in particular an elongate gas generator in the form of a tubular gas generator, comprising a deflector 20 according to the disclosure and a diffusor-deflector assembly group comprising the deflector 20. At one of its ends, the gas generator 50 comprises a diffusor 10 and, at the end opposite to the diffusor 10 or, resp., on the side of the gas generator 50 remote from the diffusor 10, comprises an igniter housing 53 which encloses a pyrotechnic-electrical igniter 52. The gas generator 50 may be a purely pyrotechnic gas generator or a hybrid gas generator which includes a compressed gas chamber filled with compressed gas when it is not activated. The deflector 20 has a deflector base body 21 with a longitudinal axis 16 and a gas discharge device 22. In the gas discharge device 22, a first outflow region 23 and a second outflow region 24 are disposed on two opposite sides. In particular, the gas discharge device 22 shows an outer contour or an outer envelope that can be referred to as box-shaped or cuboid-shaped. This offers a crucial advantage to further component parts (not shown) adjacent or connected to the gas discharge device 22 and, resp., to the deflector 20, such as a module housing or a gas filling device of an airbag to be filled with gas. Specifically, the aforementioned geometrical shape of the gas discharge device 22 and the rectangular base thereof may present a simple low-cost connecting option. In particular, the gas discharge device 22 can have, due to its box shape or cuboid shape, an extremely favorable low construction height. In other words, the gas discharge device 22 projects from the outer housing of the gas generator 50 at a small height and a small radial distance only.

Figure 2:
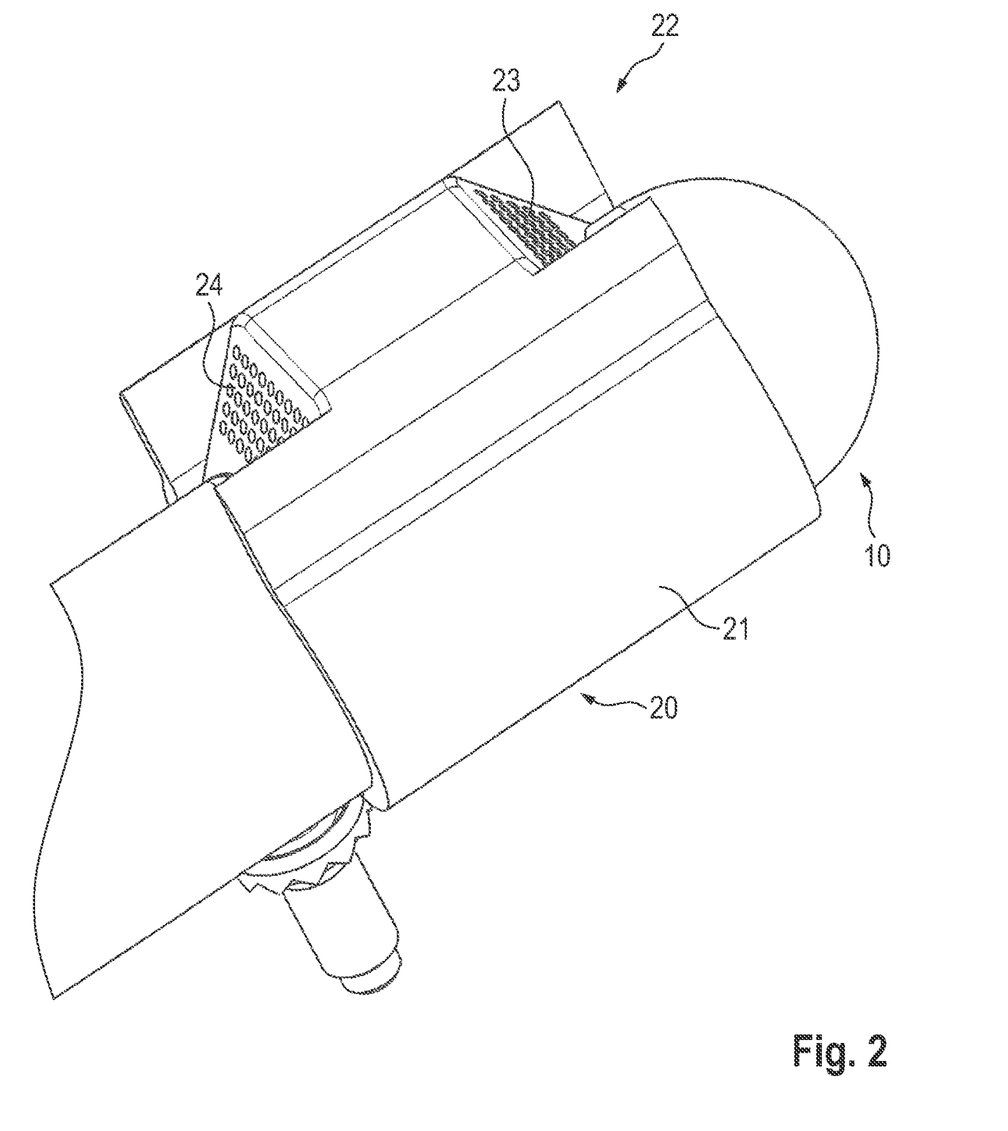
FIG. 2 shows a magnified cutout from FIG. 1.

FIG. 2 illustrates a magnified cutout from FIG. 1 in which an end-side region of the gas generator 50 to which the diffusor 10 is connected and shows the deflector 20 which, in turn, is connected to the diffusor 10. It is especially evident here that the deflector 20 is a one-piece component part which is slid from outside onto the diffusor 10 and, thus, tightly encloses the latter over a large area along an axial extension of the diffusor 10 and therefore is firmly connected to the diffusor 10. It is also possible in this context that the deflector 20 also encloses a partial area of the gas generator 50 itself, practically overlapping with the diffusor 10. Also, a front-side end of the diffusor 10 is shown which is configured in the form of a dome-shaped baffle cap 12, wherein the baffle cap 12 can be formed integrally with the diffusor 10 or can be connected to the latter as a separate additional component part.

Figure 3A:
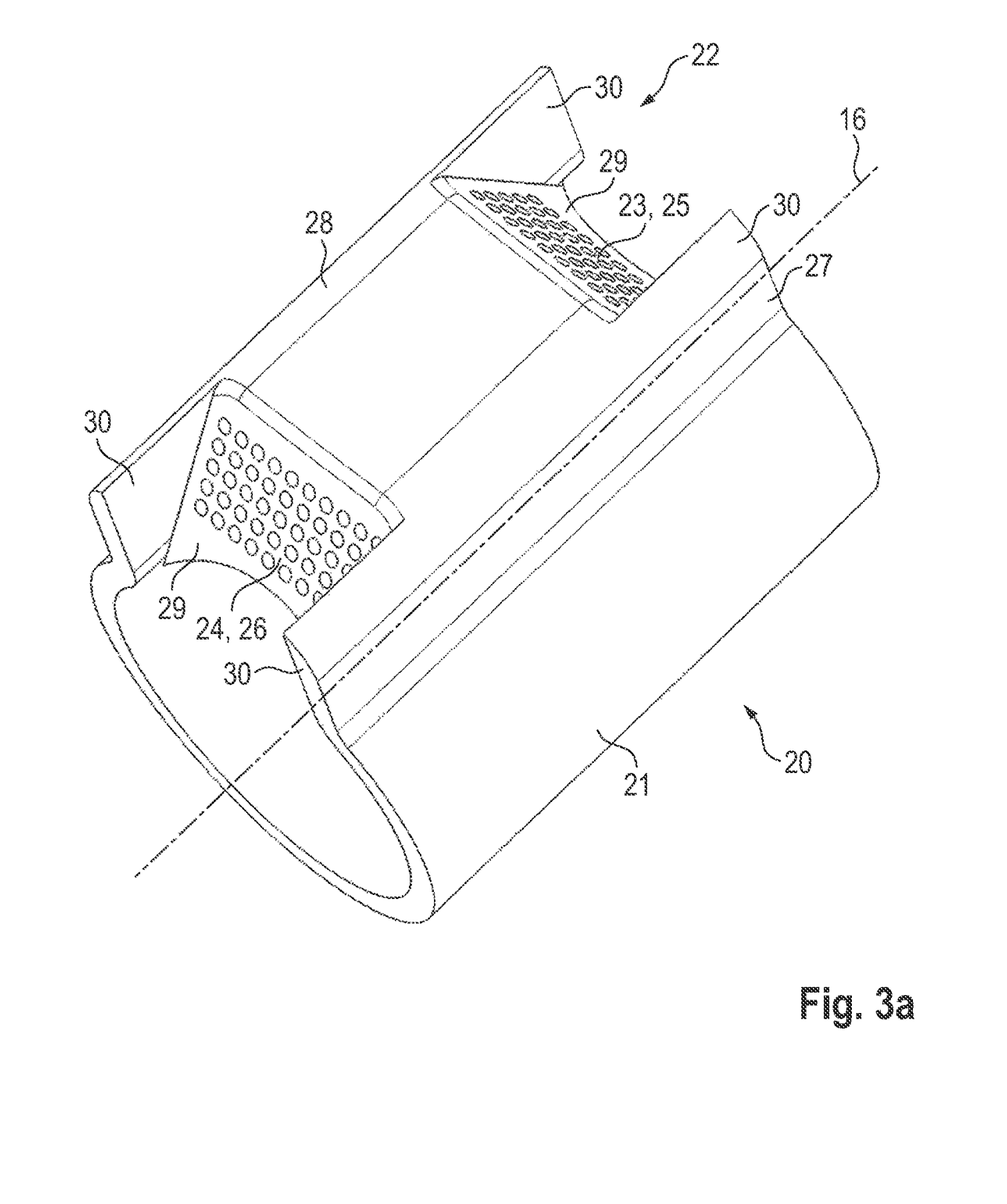
FIGS. 3*a-c* show views of a deflector according to the disclosure.
Figure 3B:
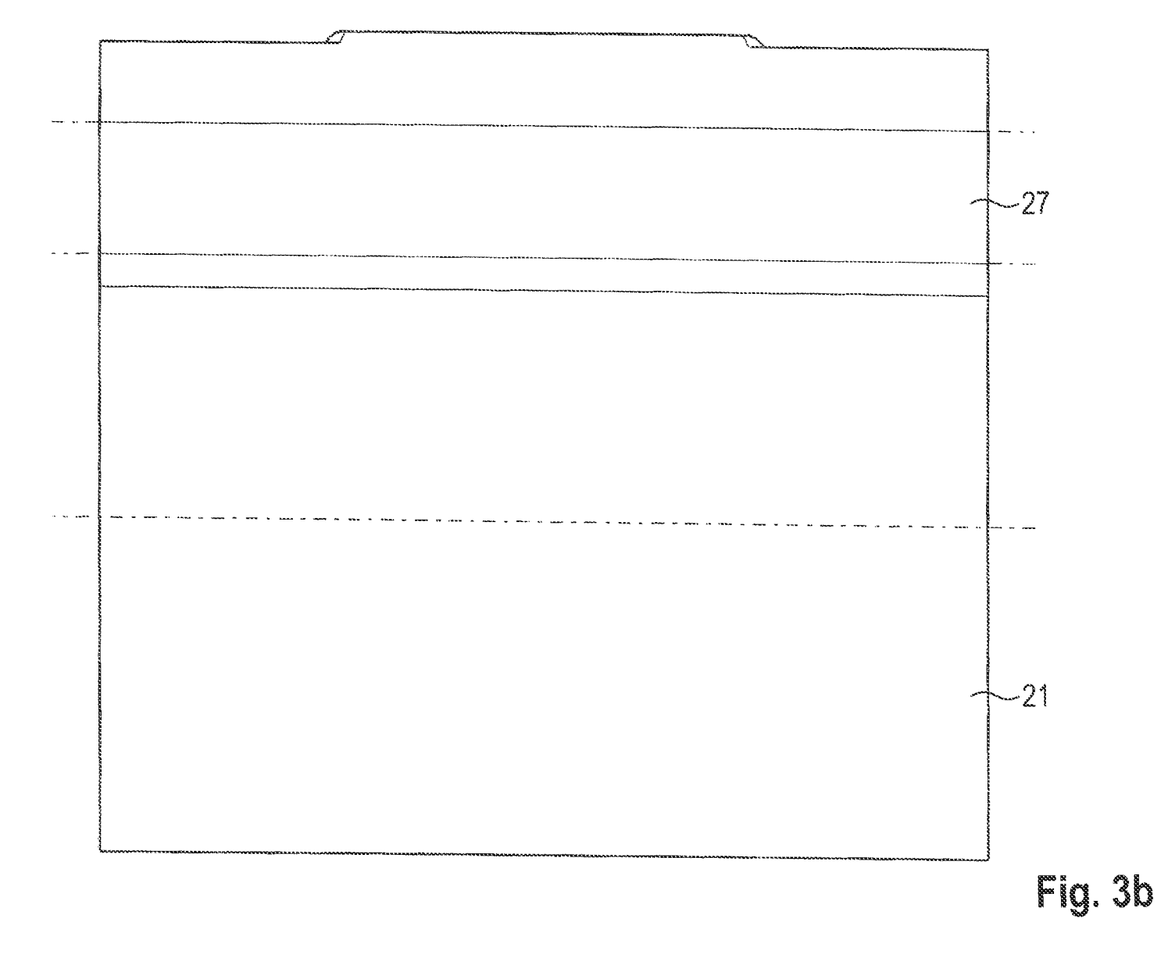
Figure 3C:
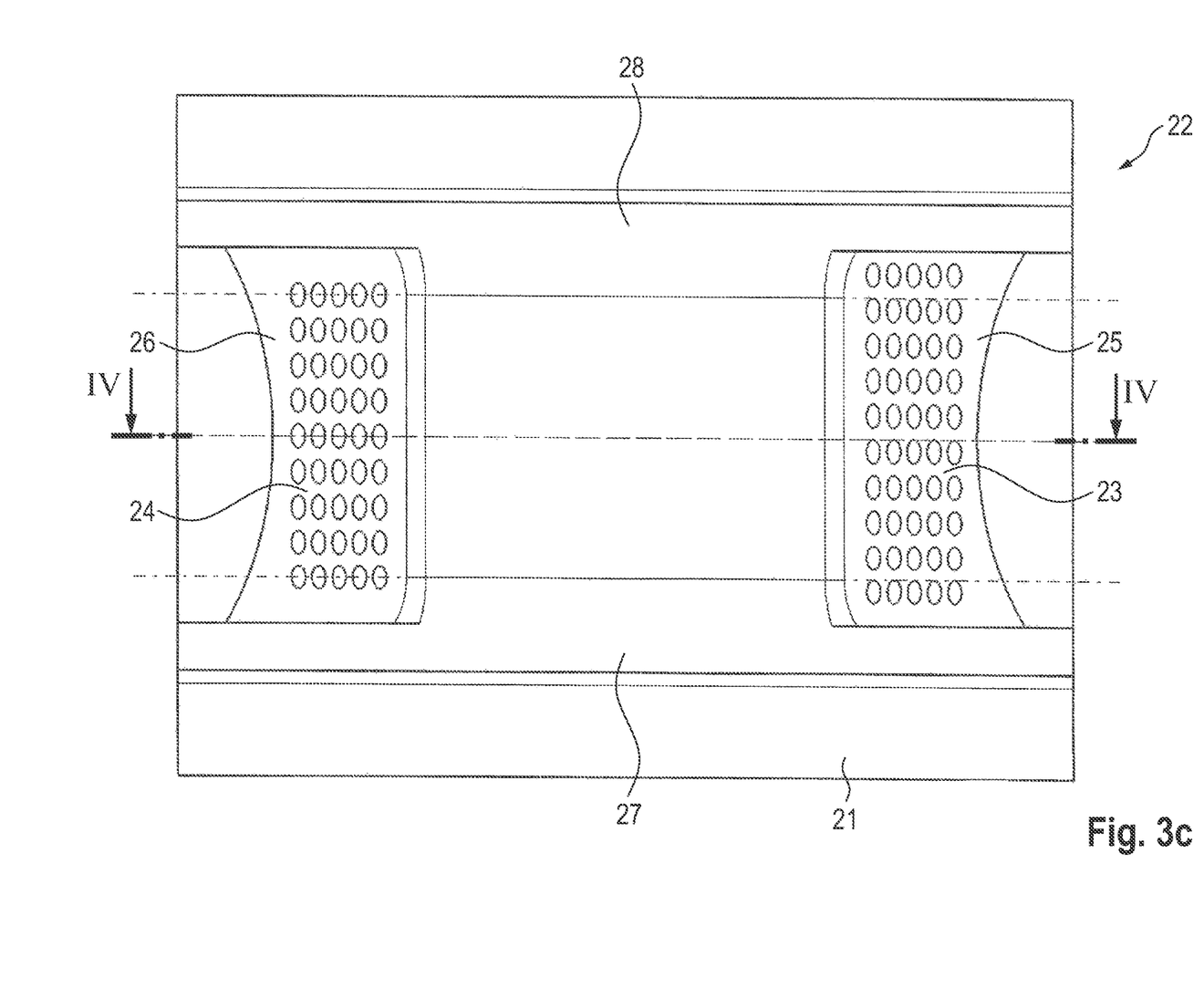

FIGS. 3*a*, 3*b* and 3*c* illustrate different views of the deflector 20 according to the, FIG. 3*a* showing a three-dimensional view, FIG. 3*b* showing a lateral view and FIG. 3*c* showing a top view of the deflector 20 according to the disclosure. In this case, too, it is clearly visible that the deflector 20 includes the tubular deflector base body 21 that is integrally connected to the gas discharge device 22. Both elements, the deflector base body 21 and the gas discharge device 22, thus can be understood to be different portions of the deflector 20, wherein the gas discharge device 22 can also be understood to be a radially outwardly configured extension being adjacent to the deflector base body 21. The gas discharge device 22 has a first sidewall 25 and a second sidewall 26 opposite thereto as well as a third sidewall 27 and a fourth sidewall 28 opposite thereto. The third sidewall 27 and the fourth sidewall 28 are substantially parallel to each other in the shown exemplary arrangement. Outer areas of each of the third sidewall 27 and the fourth sidewall 28 form guide tabs 30. The first sidewall 25 and the second sidewall 26 are formed of two deflector tabs 29 and include a first outflow region 23 and a second outflow region 24 of the gas discharge device 22. In FIG. 3*a*, the two radially inwardly tilted or bent deflector tabs 29 are also clearly visible. In other words, the two deflector tabs 29 of the gas discharge device 22 are also meant to be surface elements which can be tilted or bent inwardly about a respective axis imagined or extending perpendicular to the longitudinal axis 16 of the deflector base body 21 so that a discharge angle α, β can be set—see also FIG. 4 in this context. In other words, the two deflector tabs 29 with their outflow regions 23, 24 are a kind of gas-permeable flaps which can be "folded" in different angular settings oriented toward the deflector base body 21 so that an appropriate discharge angle (α, β) can be set or an appropriate outflowing gas flow can be adjusted for gas flowing out of the interior of the gas discharge device 22 through the gas-permeable flaps. Furthermore, each of the two deflector tabs 29 has a curved cutout or recess at its free ends, viz. at the respective inwardly bent ends. The radius of the cutout corresponds substantially to the radius of the tubular deflector base body 21. In other words, the curved cutout is designed so that, when the deflector 20 is mounted on the diffusor 10, it is adapted and matched with respect to the outer contour of the diffusor 10 in particular such that hardly any or a minimum of gas can flow through or escape between the deflector tab 29 and, resp., the curved cutout thereof and the diffusor 10.

In the top view of the deflector, shown in FIG. 3*c*, the substantially rectangular base of the gas discharge device 22 is visible. The rectangular base can be considered as a surface area that is spanned between the third and fourth sidewalls (27, 28). In the narrower sense, the rectangular base can be regarded as the surface area which is confined on the one hand by the third and fourth sidewalls (27, 28) and, on the other hand, by the two axes being perpendicular to the longitudinal axis 16 about which each of the deflector tabs 29 is tilted and, resp., bent inward. The rectangular base of the gas discharge device 22 offers, due to its geometrically simple and highly compatible design, an advantageous connecting option for further components parts (not shown) such as an airbag module housing or an inlet device or inlet opening for an airbag to be inflated.

Figure 4:
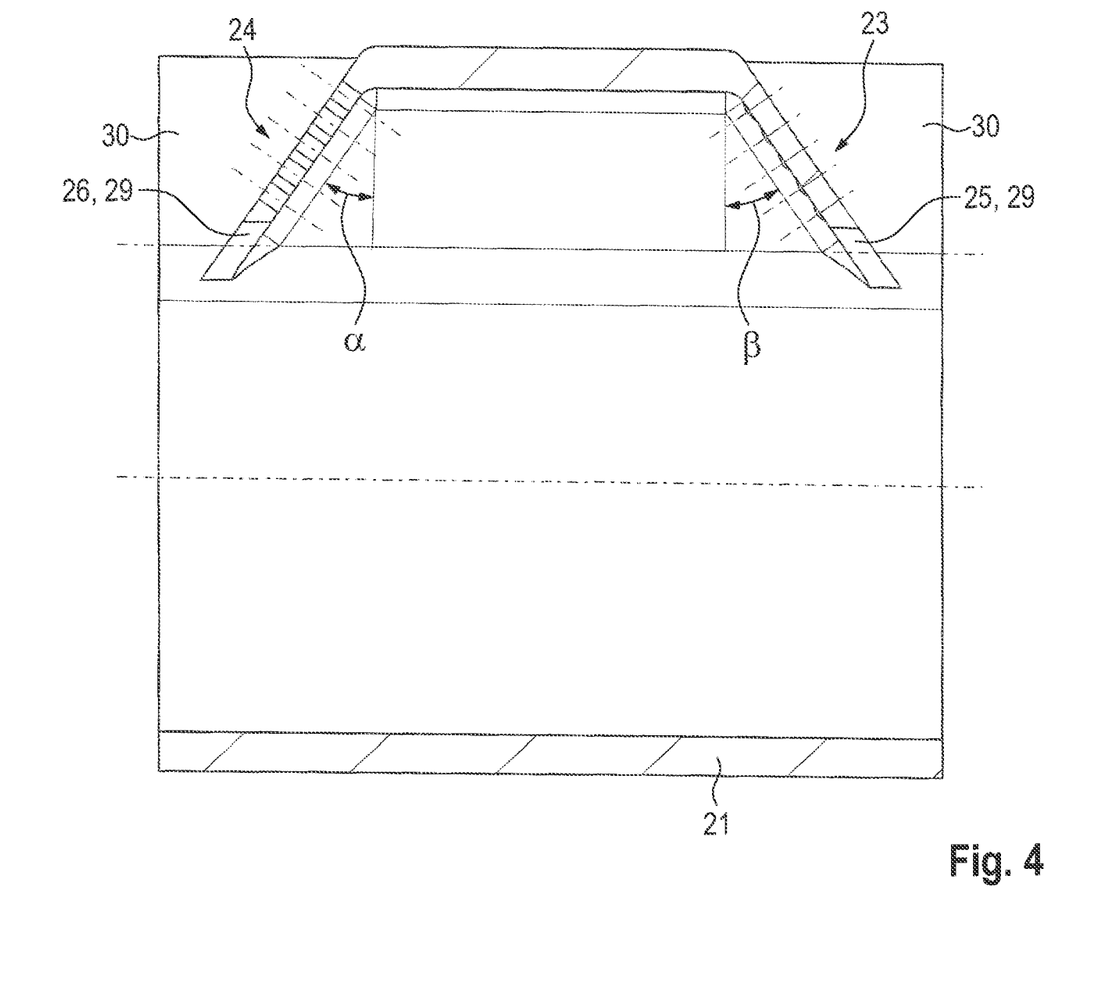
FIG. 4 shows a section across the deflector according to FIG. 3*c;*

FIG. 4 illustrates a section along IV-IV in FIG. 3*c*. The deflector tabs 29 thus are provided at an angle or, resp., a discharge angle α or β of 35°. A subarea of the deflector tabs 29 is designed as a first outflow region 23 and, resp., as a second outflow region 24. The guide tabs 30 are arranged perpendicularly to the deflector tabs 29. Hence, the deflector tabs 29 are interposed between the two guide tabs 30 and, along with the latter, form an almost box-shaped and partially open channel in which gas flowing out of the deflector 20 can be guided or directed to flow out in a certain way.

Figure 5:
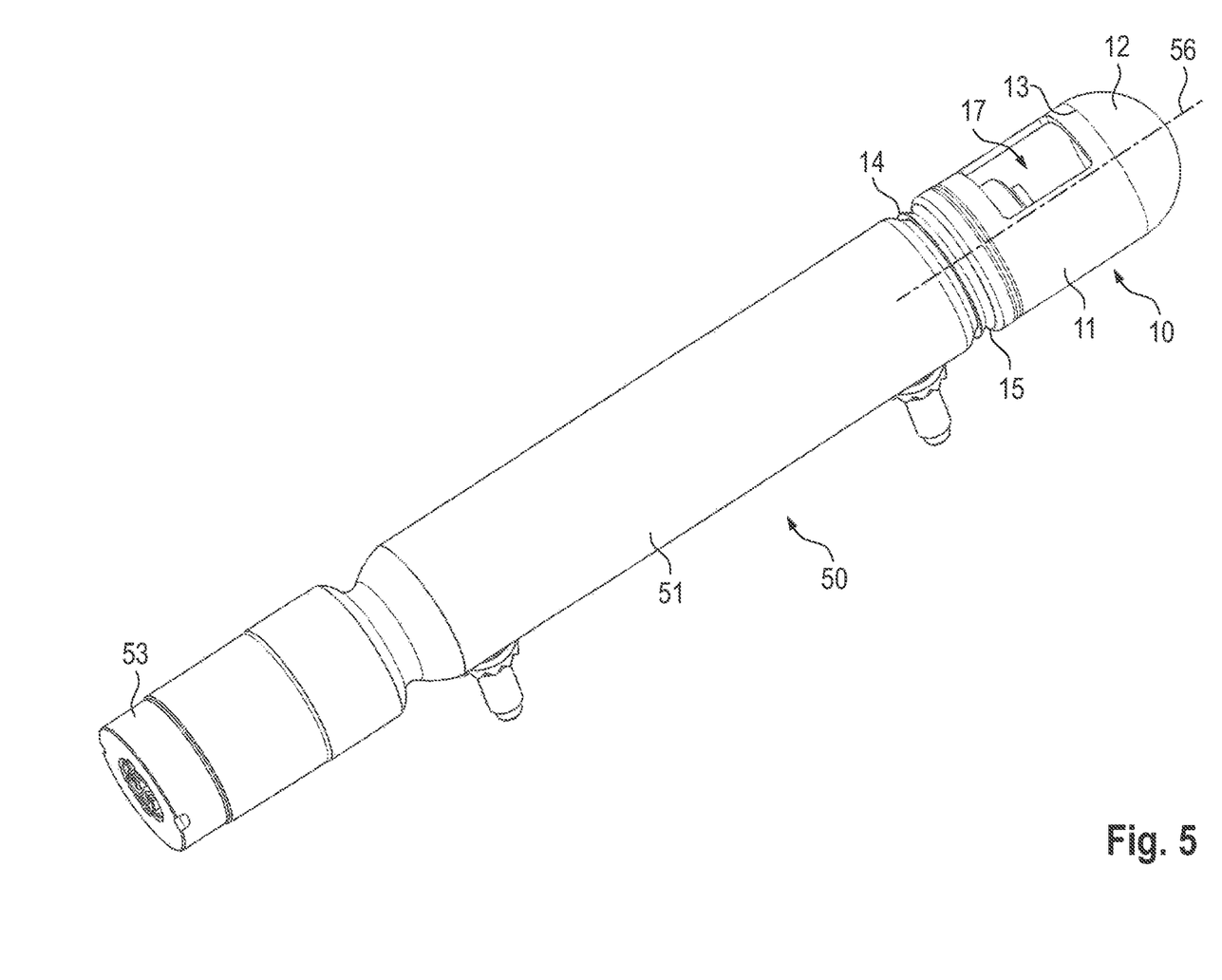
FIG. 5 shows a gas generator comprising a diffusor without a deflector.

FIG. 5 illustrates a gas generator 50 comprising a diffusor 10. The gas generator 50 includes an igniter housing 53 and a tubular housing 51. The diffusor 10 has a tubular base body 11 with a longitudinal axis 56, a first end 13 and a second end 14 facing the igniter housing 53. A baffle cap 12 formed integrally with the base body 11 is adjacent to the first end 13 of the base body 11. Alternatively, the baffle cap 12 may also be connected and, resp., fastened to the base body 11 as a separate component part. The baffle cap 12 can deflect gas flowing in the interior of the diffusor 10. Further, the diffusor includes an opening 17 having a substantially rectangular configuration. The deflector that is to be mounted on the gas generator 50, in particular on the diffusor 10 of the gas generator 50, can advantageously be positioned at or above the opening 17 such that the entire outflowing gas can flow out of the gas generator 50 and, resp., the diffusor 10 through the opening 17 directly and without any loss of gas into an interior of the deflector. In other words, the opening 17 has a geometrically advantageous design such that no or hardly any loss of gas can occur when gas flows into or over to a deflector attached to the diffusor 10, in particular a box-shaped or cuboid-shaped deflector. The diffusor 10 and the tubular housing 51 of the gas generator 50 have respective tapers 15 formed to be complementary to each other and are connected to each other at the position of the taper 15 via a crimping or roller-burnishing connection. Accordingly, the diffusor 10 can optionally be designed, before it is mounted on the gas generator 50, without such taper and can be positioned with its corresponding end above a taper in the housing 51 of the gas generator 50 and, only after that, can be connected or fastened to the housing 51 by a mounting operation by roller-burnishing or crimping, thereby forming a corresponding taper on the diffusor 10.

The invention claimed is:

1. A deflector for a diffusor of a gas generator of an airbag module,
    comprising a substantially tubular deflector base body and a gas discharge device connected thereto,
    wherein the gas discharge device includes a substantially rectangular base and two outflow regions on opposite sidewalls so that gas can flow substantially in opposite directions along a longitudinal axis of the tubular deflector base body from an interior of the gas discharge device to an outside area; and
    wherein the deflector base body is integrally connected to the gas discharge device and the outflow regions are disposed in two deflector tabs of the gas discharge device which can be positioned relative to an axis being perpendicular to the longitudinal axis so that a respective discharge angle can be set between 0° and 35°.

2. The deflector according to claim 1, wherein
    a guide tab is arranged on both sides perpendicularly to each of the deflector tabs, wherein the guide tabs are formed by opposite sidewalls of the gas discharge device.

3. The deflector according to claim 2, wherein each of the deflector tabs includes, on a side facing the tubular deflector base body, a curved cutout with a radius that corresponds to a radius of the tubular deflector base body.

4. The deflector according to claim 1, wherein
    each of the deflector tabs includes, on a side facing the tubular deflector base body, a curved cutout with a radius that corresponds to a radius of the tubular deflector base body.

5. A diffusor-deflector assembly group for a gas generator, comprising:
    a diffusor having a substantially tubular base body with a longitudinal axis,
    a baffle cap connected to the base body at a first end of the base body, a connecting device configured at a second end opposite to the first end of the base body, wherein at least one opening is formed in a wall of the tubular base body, and, and
    a deflector for a diffusor of a gas generator of an airbag module, comprising a substantially tubular deflector base body and a gas discharge device connected thereto, wherein the gas discharge device includes a substantially rectangular base and two outflow regions on opposite sidewalls so that gas can flow substantially in opposite directions along a longitudinal axis of the tubular deflector base body from an interior of the gas discharge device to an outside area, the deflector having deflector tabs,
    wherein an outer diameter of the base body of the diffusor is slightly smaller than an inner diameter of the deflector, the outer diameter of the base body of the diffusor and the inner diameter of the deflector being positively adapted to each other.

6. The diffusor-deflector assembly group according to claim 5, wherein
    the at least one opening is a substantially rectangular opening which has a length corresponding to a distance between axes of each deflector tab and a width corresponding to the deflector tab width.

7. The diffusor-deflector assembly group according to claim 5, wherein
    the at least one opening is formed by a plurality of through-holes in an outflow region of the base body of the diffusor which has a length corresponding to a distance between deflector tab axes and a width corresponding to the deflector tab width.

8. A gas generator for an airbag module comprising a tubular housing and comprising a diffusor-deflector assembly group according to claim 5 that is arranged at a first end of the gas generator, the gas generator being one of a pyrotechnic gas generator or a hybrid gas generator.

9. The gas generator according to claim 8,
    wherein a diameter of the gas generator and a diameter of the diffusor are substantially equal, wherein the housing of the gas generator at the first end includes a taper in which a taper of the diffusor engages.

10. An airbag module comprising a gas generator, an airbag inflatable by the gas generator and a fastening device for attaching the airbag module to a vehicle,
    wherein the gas generator is configured according to claim 8.

11. A vehicle safety system for protecting a person such as a vehicle occupant or a pedestrian, comprising a gas generator, an airbag inflatable by the latter as part of an airbag module, and an electronic control unit that activates the gas generator when a release situation is given,
    wherein the gas generator is configured according to claim 8.

12. The diffusor-deflector assembly group according to claim 5, wherein the connecting device is in the form of a taper.

13. A method for manufacturing a deflector for a diffusor of a gas generator of an airbag module, comprising the following steps of:
    a. providing a tubular deflector base body having a predetermined inner diameter and a first end and a second end,
    b. forming a profile in a circumferential tube section of the deflector base body by application of a profile tool by pressing or pulling the profile tool from an inner face of the deflector base body against a wall of the deflector base body in a radial direction,
    c. producing through-holes in an area of the profile and producing a curved cutout at each of opposite ends of the profile,
    d. cutting the profile in the axial direction from first and second ends of the profile up to a predetermined length by two cuts spaced apart from each other so that a deflector tab is produced at each of the two ends of the profile, and
    e. bending both deflector tabs radially inward to an angle of from 0° to 35° with respect to a radial direction.

14. The method according to claim 13,
    wherein the profile tool is a square profile tool.

15. The method of claim 13, wherein the cuts are arranged at edges of the profile.

* * * * *